(12) United States Patent
Ford

(10) Patent No.: US 6,681,987 B1
(45) Date of Patent: Jan. 27, 2004

(54) SMART CARD SYSTEM FOR HEAVY VEHICLES

(75) Inventor: Gary Ford, St. Joseph, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/522,352

(22) Filed: Mar. 9, 2000

(51) Int. Cl.$^7$ .................................................. G06K 5/00
(52) U.S. Cl. ........................ 235/380; 235/382; 235/384; 235/492; 701/32
(58) Field of Search ................................ 235/380, 384, 235/382, 492; 701/32, 1

(56) References Cited

U.S. PATENT DOCUMENTS

| | | | |
|---|---|---|---|
| 4,204,255 A | | 5/1980 | Cremer |
| 4,404,641 A | | 9/1983 | Bazarnik |
| 4,441,359 A | | 4/1984 | Ezoe |
| 4,477,874 A | | 10/1984 | Ikuta et al. |
| 4,533,900 A | | 8/1985 | Muhlberger et al. |
| 4,660,140 A | | 4/1987 | Illg |
| 4,707,788 A | | 11/1987 | Tashiro et al. |
| 4,731,769 A | | 3/1988 | Schaefer et al. |
| 4,739,482 A | | 4/1988 | Wrigge |
| 4,773,011 A | | 9/1988 | VanHoose |
| 4,787,041 A | | 11/1988 | Yount |
| 4,926,331 A | | 5/1990 | Windle et al. |
| 4,939,652 A | | 7/1990 | Steiner |
| 4,975,847 A | | 12/1990 | Abe et al. |
| 4,982,072 A | * | 1/1991 | Takigami ..................... 235/384 |
| 5,046,007 A | | 9/1991 | McCrery |
| 5,091,856 A | | 2/1992 | Hasegawa et al. |
| 5,253,052 A | | 10/1993 | Hanashiro et al. |
| 5,365,436 A | | 11/1994 | Schaller et al. |
| 5,400,018 A | | 3/1995 | Scholl et al. |
| 5,475,399 A | | 12/1995 | Borsuk |
| 5,479,347 A | | 12/1995 | Oguro et al. |
| 5,555,171 A | | 9/1996 | Sonehara et al. |
| 5,675,490 A | * | 10/1997 | Bachhuber ........... 364/424.037 |
| 5,680,328 A | | 10/1997 | Sorupski et al. |
| 5,777,570 A | * | 7/1998 | Kokubu ..................... 340/5.61 |
| 5,778,381 A | | 7/1998 | Sandifer |
| 5,787,373 A | | 7/1998 | Migues |
| 5,794,164 A | * | 8/1998 | Beckert et al. ............. 455/3.06 |
| 5,797,107 A | | 8/1998 | Berg et al. |
| 5,801,767 A | | 9/1998 | Wu |
| 5,812,399 A | | 9/1998 | Judic et al. |
| 5,848,365 A | | 12/1998 | Coverdill |
| 5,859,628 A | | 1/1999 | Ross et al. |
| 5,916,286 A | | 6/1999 | Seashore et al. |
| 5,928,291 A | * | 7/1999 | Jenkins et al. ................. 701/1 |
| 5,931,878 A | | 8/1999 | Chapin, Jr. |
| 5,933,125 A | | 8/1999 | Fernie et al. |
| 5,948,026 A | | 9/1999 | Beemer, II. et al. |

(List continued on next page.)

OTHER PUBLICATIONS

U.S. patent application and Draw ings for "Personal Data Computer For Vehicle Monitoring", Ser. No. 09/591,970; Filed Jun. 12, 2000.

(List continued on next page.)

Primary Examiner—Michael G. Lee
Assistant Examiner—Seung H Lee
(74) Attorney, Agent, or Firm—Carlson, Gaskey & Olds

(57) ABSTRACT

A communication system for use on a heavy vehicle, such as a truck, is disclosed where a smart card is provided by a fleet to a driver. The smart card contains identifying information unique to the driver. The smart card communicates electronically with an engine control unit that is provided on the vehicle used by the driver. The on board engine control unit stores the vehicle operation history with respect to an individual driver and may also contain navigational information. In the event that the on board engine control unit indicates a violation of hours of service regulation, the vehicle may be prevented from being started by the driver. The smart card is also used for vehicle access and may be used for conventional fuel purchase.

6 Claims, 1 Drawing Sheet

U.S. PATENT DOCUMENTS

| | | | |
|---|---|---|---|
| 5,955,981 A | * | 9/1999 | Rangan ..................... 307/10.4 |
| 5,961,561 A | | 10/1999 | Wakefield, II |
| 5,964,813 A | | 10/1999 | Ishii et al. |
| 5,990,800 A | | 11/1999 | Tamaki et al. |
| 6,003,808 A | | 12/1999 | Nguyen et al. |
| 6,006,147 A | | 12/1999 | Hall et al. |
| 6,006,148 A | | 12/1999 | Strong |
| 6,009,363 A | | 12/1999 | Beckert et al. |
| 6,029,102 A | * | 2/2000 | Elsman .......................... 701/1 |
| 6,052,631 A | | 4/2000 | Busch et al. |
| 6,055,468 A | | 4/2000 | Kaman et al. |
| 6,073,062 A | * | 6/2000 | Hoshino et al. ............... 701/3 |
| 6,073,063 A | | 6/2000 | Leong Ong et al. |
| 6,084,567 A | | 7/2000 | Ogawa |
| 6,104,971 A | | 8/2000 | Fackler |
| 6,182,006 B1 | | 1/2001 | Meek |
| 6,275,231 B1 | * | 8/2001 | Obradovich ................ 345/970 |
| 6,310,542 B1 | * | 10/2001 | Gehlot ....................... 340/426 |

OTHER PUBLICATIONS

U.S. patent application and Draw ings for "Individualized Vehicle Settings", Ser. No. 09/767,930; Filed Jan. 22, 2001.

U.S. patent application and Draw ings for "Vehicle Systems Data Storage", Ser. No. 09/767,932; Filed Jan. 23, 2001.

U.S. patent application and Draw ings for "Vehicle Driver Data", Ser. No. 09/850,455; Filed May 7, 2001.

U.S. patent application and Draw ings for "Vehicle Data Display Device", Ser. No. 09/716,718; Filed Nov. 20, 2000.

U.S. patent application and Draw ings for "Automated Vehicle Shutdown Sequence", Ser. No. 09/767,999; Filed Jan. 23, 2001.

U.S. patent application and Draw ings for "Vehicle Insepection and Maintenance System", Filed on Aug. 8, 2001.

* cited by examiner

SMART CARD SYSTEM FOR HEAVY VEHICLES

BACKGROUND OF THE INVENTION

This invention relates to an on board communication system for use in heavy vehicles which use a microprocessor based card, or 'smart card', that communicates with an on board computer, or engine control unit, for storing pertinent information relating to an individual vehicle user.

During the transport of goods by heavy vehicles, such as trucks, a significant amount of data requires logging by a vehicle user. Such data includes driver identification, trip information, and hours of vehicle operation history for the driver. Current systems for vehicle entry, security, and recording of regulatory requirements involve several devices and require significant driver interaction. The manual handling of data is costly and provides many operational challenges with respect to security and regulatory compliance issues.

For example, fleet service regulations may require that a driver not exceed a predetermined number of operational hours in a given time period. Typically, vehicle operational history and navigational information are manually logged by a vehicle driver. This allows little control by a fleet owner of the regulatory status and usage of individual trucks of a fleet. A driver may be in violation of hours of service regulation without the knowledge of the fleet owner.

The use of an electronic smart card for use during the purchase of fuel and vehicle entry is known in light vehicles.

It would be desirable to provide heavy vehicles, such as trucks, with a unique smart card system for electronically storing and communicating data pertaining to an individual driver and his or her respective vehicle and further, to provide a system for regulating the use of a vehicle based on stored data. Thus, a fleet owner may ultimately have greater control over the usage of an individual vehicle. The same unique smart card may be used for vehicle access and also for the traditional function of purchasing fuel.

SUMMARY OF THE INVENTION

In the disclosed embodiment of this invention, an on board communication system using a microprocessor based card, or 'smart card', is provided by a fleet to a driver. The card contains identifying information unique to the driver. The respective truck to be operated by the driver contains an on board engine control unit that communicates electronically with the smart card and has been programmed to allow entry and vehicle operation only to the identified driver. The on board engine control unit may also be programmed to contain trip data and navigational information.

The on board communication system may contain a radio frequency system for the electronic exchange of data between the smart card and the on board engine control unit at a predetermined distance. Alternatively, an on board docking device for the smart card may also be employed. Thus, by way of the inventive on board communication system, vehicle entry, security, and recording of regulatory requirements require less mechanical devices as well as reduced driver interaction while allowing greater control of individual vehicles to a fleet owner.

These and other features of the present invention can behest understood from the following specification and drawings, the following of which is a brief description.

DETAILED DESCRIPTION OF THE PREFERRED EMBODIMENT

Figure 1:
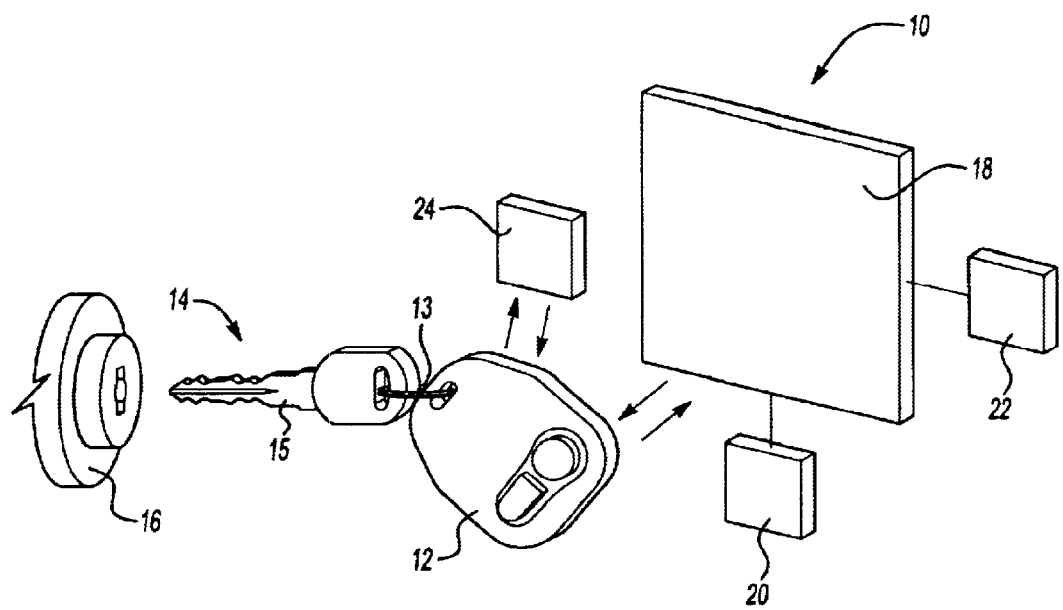
FIG. 1 schematically shows an on board communication system of the present invention that uses a smart attached to a vehicle ignition key.

As shown schematically in FIG. 1, the on board communication system of the present invention is shown generally at 10. The on board communication system 10 includes smart card 12 which is shown attached to the key ring 13 of ignition system 14. Ignition system 14 includes ignition key 15 and ignition lock 16.

Smart card 12 is provided to a driver by a fleet and contains identifying information unique to the individual driver. An on board engine control unit 18 communicates electronically with smart card 12. The on board communication system 10 may include a radio frequency system shown schematically at 20 for the electronic exchange of data between the smart card 12 and the on board engine control unit 18 at a predetermined maximum distance. On board engine control unit 18 is programmed to allow vehicle entry and operation only to the driver identified by smart card 12. The on board engine control unit 18 may also contain pertinent trip data as well as navigational information.

Figure 2:
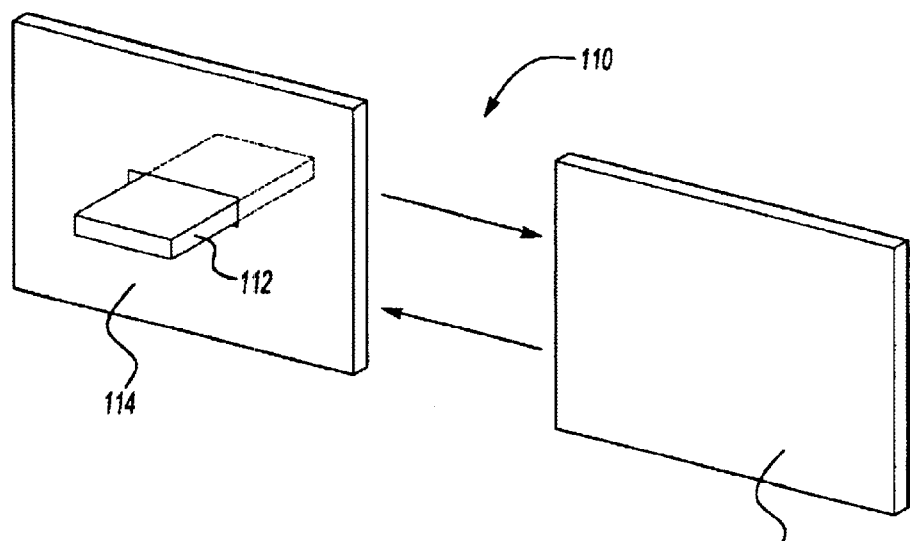
FIG. 2 schematically shows an on board communication system of the present invention that includes a docking device for receiving the smart card inside of the vehicle.

FIG. 2 schematically shows an alternative embodiment of the on board communication system of the present invention shown generally at 110. In this embodiment, smart card 112 is received by an on board dock device 114. Data from smart card 112 is communicated electronically to engine control unit 118.

With respect to FIG. 1, the on board communication system 10 of the present invention operates as follows: Upon the driver approaching the vehicle with smart card 12 in hand, the vehicle will automatically unlock and remove other security barriers to operation. The security system is show generally at 24. Once the driver is inside the vehicle, the on board engine control unit 18 will establish an electronic communications link to the smart card 12. Information stored on the smart card 12, such as the hours of operation history for the driver, will be transmitted to the on board engine control unit 18.

In the event that the driver is in violation of hours of service regulations, the on board engine control unit 18 may further communicate with an alerting system 22 that may prevent the vehicle from starting. If the driver will become in violation during an upcoming programmed trip, alerting system 22 may then display a warning. It may be noted that the smart card 12 used for vehicle access and regulatory compliance can also be used for vehicle fuel purchase.

The present invention provides a powerful tool to assist a fleet owner in monitoring operation of the vehicle. As an example, the control unit will communicate to the smart card, and be able to store the operational history of the vehicle by the individual driver. Thus, the control unit will be able to store information relative to the number of hours that the particular driver has driven the particular vehicle. If the particular number of hours driven within a predetermined period of time exceeds a maximum, then the light 22 can be lit, or the vehicle can actually be prevented from starting. Further, when the proposed trip information is stored into the control unit, the control unit can predict the approximate drive time for a particular trip. If the approximate drive time added to the amount of time the driver has already driven with result in a violation, then the display may also be sent, or the vehicle may be prevented from starting. Moreover, the same information about operator history may be stored from the control unit back onto the smart card 12. In this way, should the operator switch vehicles, the card would still have stored information with regard to the amount of drive time the particular operator has performed in the particular time period.

Finally, the trip history, including the information which has typically been provided in the form of a manual log can be stored on the smart card. This will assist the operator in properly preparing trip reports.

A preferred embodiment of this invention has been disclosed. However, a worker of ordinary skill in the art would recognize that certain modifications would come within the scope of this invention. For that reason, the following claims should be studied to determine the true scope and content of this invention.

What is claimed is:

1. A method of regulating the use of a heavy vehicle by a respective driver comprising the steps of:

providing the driver with a smart card that contains identifying information unique to said driver and is designed to electronically communicate with an engine control unit on board the vehicle;

operating said vehicle;

determining vehicle operation history unique to said driver; and providing a system that responds to said identifying information and said vehicle operation history, and controlling said system based upon said identifying information and said operation history, wherein said system that responds to said identifying information and said vehicle operation history prevents the vehicle from being started when said vehicle operation history indicates a violation of service regulations comprising the service hours of particular driver exceeding a predetermined maximum of service hours of the particular driver.

2. The method as recited in claim 1, wherein said engine control unit is provided with trip information, and is operable to calculate an approximate drive time for the particular trip, said approximate drive time being added to the time the particular operator has already operated the vehicle in making the determination whether predetermined maximum service of hours is exceeded.

3. The method as recited in claim 1, wherein said engine control unit stores trip information on said smart card.

4. The method as recited in claim 1, wherein said smart card is carried on board the vehicle by a driver.

5. The method as recited in claim 1, wherein said smart card is carried on board by a driver and is received in an on board docking device.

6. The method as recited in claim 1 comprising the step of providing a security system that responds to said identifying information and said vehicle operation history, and controlling said security system based upon said identifying information and said operation history, wherein the security system bars entry to the vehicle unless said identifying information on said smart card matches information contained on said on board engine control unit.

* * * * *